No. 685,046. Patented Oct. 22, 1901.
W. H. JOHNSTON.
CABLE HANGER.
(Application filed Apr. 1, 1901.)
(No Model.)

Witnesses:
Herbert J. Obergfell
John Stahl

Inventor:
Wilbur H. Johnston.
By Charles A. Brown Gagge Belfield
Attorneys.

UNITED STATES PATENT OFFICE.

WILLBUR H. JOHNSTON, OF CHICAGO, ILLINOIS, ASSIGNOR TO HALLETT IRON WORKS, OF CHICAGO, ILLINOIS, A CORPORATION OF ILLINOIS.

CABLE-HANGER.

SPECIFICATION forming part of Letters Patent No. 685,046, dated October 22, 1901.

Application filed April 1, 1901. Serial No. 53,851. (No model.)

*To all whom it may concern:*

Be it known that I, WILLBUR H. JOHNSTON, a citizen of the United States, residing at Chicago, in the county of Cook and State of Illinois, have invented a certain new and useful Improvement in Cable-Hangers, (Case No. 2,) of which the following is a full, clear, concise, and exact description, reference being had to the accompanying drawings, forming a part of this specification.

My invention relates to cable-hangers, and has for its object the provision of an improved means for attaching the hanger to the cable.

Generally speaking, my invention comprises a band or strap composed, preferably, of metal and provided at its ends with the members of a locking device, one of the members of the said locking device having pivotal or rotary connection with the said strap and also adapted for separable engagement with the remaining locking member and having rotary engagement therewith, the lines or axes about which the said locking member rotates with respect to the strap and the companion locking member being displaced, so that when the rotating locking member is in one position the ends of the strap may be separated and the locking members disengaged, or the ends of the strap may be brought closer together and the locking members engaged and locked in position. To insure a firm engagement between the locking members, I employ an auxiliary locking device, preferably in the form of cam mechanism adapted for engagement with the rotating locking member and mounted upon the companion member. This locking-cam mechanism is preferably provided upon the ends of the supporting-loop that is thus secured to the cable and which in turn serves to support the cable from the stringer wire or messenger. To more effectively prevent the rotating locking member from rotating to separate the ends of the strap, and thereby permit a disengagement of the members of the locking device, I provide a couple of detents upon the rotating locking member, that engage the cams provided upon the supporting-loop.

I will explain my invention more fully by reference to the accompanying drawings, in which—

Figure 1:
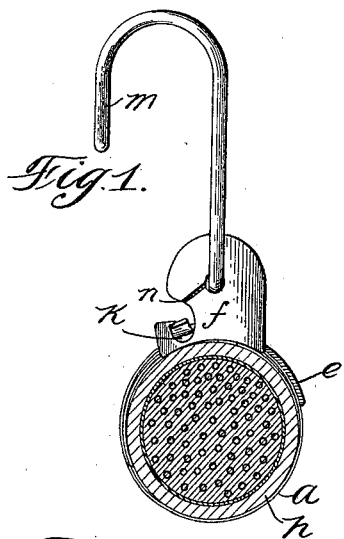
Figure 2:
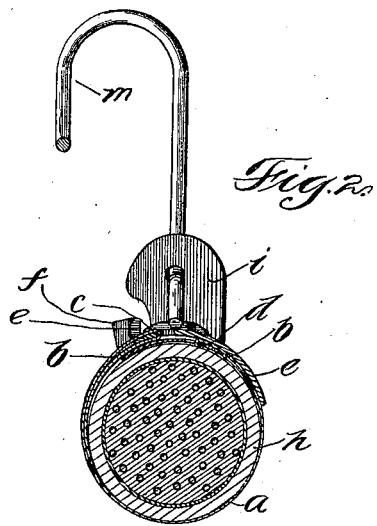
Figure 3:
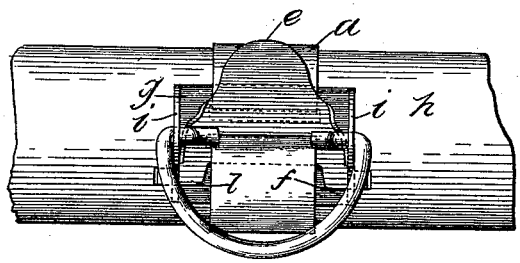
Figure 4:
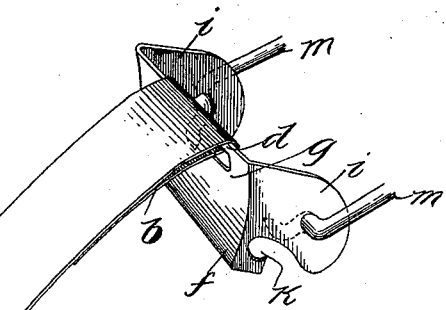
Figure 4:
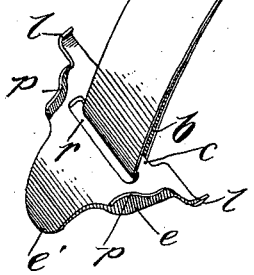
Figure 5:
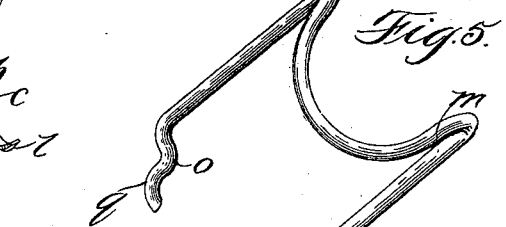

Figure 1 is a side elevation of a locking device constructed in accordance with my invention, the cable being shown in section. Fig. 2 is a sectional view through the middle portion of the lock. Fig. 3 is a plan view of the structure shown in Fig. 1. Fig. 4 is a perspective view of the cable-hanger removed from the cable, the supporting-strap being nearly straightened. Fig. 5 is a perspective view of the cable-supporting loop.

Like parts are indicated by similar characters of reference throughout the different figures.

A hanger-strap $a$ is provided with loops $b\ b$, that engage the buckle-bars $c\ d$, provided upon the locking members $e\ f$. The locking member $e$ is curved transversely to conform to the curvature of the cable. The locking member $f$ is provided with a base $g$, that extends longitudinally of the cable $h$ and is curved transversely to conform to the curvature of the cable. Two ears $i\ i$ are provided at the ends of the base portion and extend across the cable. These ears are provided with open sockets $k\ k$, that receive the ears $l\ l$, that extend longitudinally of the cable, and are transversely arranged with respect to the locking member $e$. The supporting-loop $m$, composed, preferably, of wire, is designed to be placed over the stringer located above the cable, and is secured to the locking member $f$ by having its lower ends passed through holes provided in the ears $i\ i$. To permit this engagement of the loop with the ears, one of the ears is provided with a slit $n$, that permits the metal at the hole to be twisted to one side, so that the loop may be readily placed in position by having one end first inserted through the hole in the opposite ear, and thereafter the other end of the loop is placed in the hole of the companion ear by being passed between the separated sides of the slit, after which the separated portions of the latter ear may be brought together. The supporting-loop $m$ thus has a pivotal connection with the locking member $f$, and the cams $o\ o$, carried upon the ends of the supporting-loop, may be swung from side to side.

In placing the cable-hanger about the cable the parts may be placed in the positions indicated in Fig. 4, where the pivotal ears are located in advance of the buckle-bar c, in which position the ends of the strap are separated. By grasping the nose e' the locking member e may be rotated upon the buckle-bar c to bring this buckle-bar in advance of the ears l l, thereby drawing the ends of the strap together. The construction of the locking members is such that with the ends of the strap thus brought closer together the locking members tend to maintain engagement. To more effectively insure the permanency of this engagement between the locking members, the locking member e may be provided with cams having curved portions p p, with which cams o o may have engagement, the shoulder portions q q of the cams o o having engagement with the cam portions p p. The extreme ends of the cams o o also engage the slot r, provided in the locking member e, to further insure the locking engagement between the members of the hanger-lock and to hold the loop m in an upright position. When the members of the lock are to be separated, the supporting-loop m is swung to one side. When the loop m is in an upright position, the cams o o secure the parts e and f together. When the parts of the cable-hanger are assembled about a cable, as illustrated in Figs. 1, 2, and 3, the cable-hanger will not become separated.

By means of my construction I am enabled to provide a very simple form of cable-hanger, wherein the binding-strap may be tightly engaged with the cable and readily clamped in position about the same and firmly secured in place.

While I have herein shown and particularly described the preferred embodiment of my invention, it is obvious that changes may readily be made without departing from the spirit thereof, and I do not wish to be limited to the precise construction herein set forth; but, Having described my invention, I claim as new and desire to secure by Letters Patent—

1. In a device of the character described, the combination with a strap, of locking members secured to the ends thereof, the said locking members being provided with ears and sockets to provide a relative rotary motion between the said locking members, one of the said locking members being provided with a buckle-bar having engagement with the strap and located out of line with the said ears, so that in one position of rotary adjustment the ends of the strap will be separated and in the alternate position brought closer together, substantially as described.

2. In a device of the character described, the combination with a strap, of locking members secured to the ends thereof, the said locking members being provided with ears and sockets to provide a relative rotary motion between the said locking members, one of the said locking members being provided with a buckle-bar having engagement with the strap and located out of line with the said ears, so that in one position of rotary adjustment the ends of the strap will be separated and in the alternate position brought closer together, and locking mechanism for maintaining the members of the lock in locking engagement, substantially as described.

3. In a device of the character described, the combination with a strap, of locking members secured to the ends thereof, the said locking members being provided with ears and sockets to provide a relative rotary motion between the said locking members, one of the said locking members being provided with a buckle-bar having engagement with the strap and located out of line with the said ears, so that in one position of rotary adjustment the ends of the strap will be separated and in the alternate position brought closer together, a rotary cam portion o carried upon one of the locking members, and a cam portion p carried upon the other, whereby the locking engagement between the members of the lock may be secured, substantially as described.

4. In a device of the character described, the combination with a strap a, of a locking member f secured to one end of the strap and provided with sockets k k, a second locking member e having rotary connection with the other end of the strap, and ears l l provided upon the latter locking member adapted for insertion within the said sockets, the point of attachment of the strap a with the locking member e being out of line with the axis of rotation of the ears l within the sockets k, substantially as described.

5. In a device of the character described, the combination with a strap a, of a locking member f secured to one end of the strap and provided with sockets k k, a second locking member e having rotary connection with the other end of the strap, ears l l provided upon the latter locking member adapted for insertion within the said sockets, the point of attachment of the strap a with the locking member e being out of line with the axis of rotation of the ears l within the sockets k, and means for locking the member e in place, substantially as described.

6. In a cable-hanger, the combination with a strap a, of a locking member e provided with ears l l and a buckle-bar c located out of line with the ears l l, the said buckle-bar having engagement with one end of the strap, and a locking member f having engagement with the other end of the strap and provided with sockets k k with which the ears l l have engagement, whereby the ends of the strap may be separated and be brought together, substantially as described.

7. In a cable-hanger, the combination with a strap a, of a locking member e provided with ears l l and a buckle-bar c located out of line with the ears l l, the said buckle-bar having engagement with one end of the strap, and a locking member $f$ having engagement with the other end of the strap and provided with sockets $k\ k$ with which the ears $l\ l$ have engagement, whereby the ends of the strap may be separated and be brought together, the locking member $e$ being curved transversely to conform in contour to the curvature of the cable, substantially as described.

8. In a cable-hanger, the combination with a strap $a$, of a locking member $e$ provided with ears $l\ l$ and a buckle-bar $c$ located out of line with the ears $l\ l$, the said buckle-bar having engagement with one end of the strap, a locking member $f$ having engagement with the other end of the strap and provided with sockets $k\ k$ with which the ears $l\ l$ have engagement, whereby the ends of the strap may be separated and be brought together, and means for maintaining the members of the lock in engagement, substantially as described.

9. In a cable-hanger, the combination with a strap $a$, of a locking member $e$ provided with ears $l\ l$ and a buckle-bar $c$ located out of line with the ears $l\ l$, the said buckle-bar having engagement with one end of the strap, a locking member $f$ having engagement with the other end of the strap and provided with sockets $k\ k$ with which the ears $l\ l$ have engagement, whereby the ends of the strap may be separated and be brought together, the locking member $e$ being curved transversely to conform in contour to the curvature of the cable, and means for maintaining the members of the lock in engagement, substantially as described.

10. In a cable-hanger, the combination with a strap $a$, of a locking member $e$, provided with ears $l\ l$ and a buckle-bar $c$ located out of line with the ears $l\ l$, the said buckle-bar having engagement with one end of the strap, a locking member $f$ having engagement with the other end of the strap and provided with sockets $k\ k$ with which the ears $l\ l$ have engagement, whereby the ends of the strap may be separated and be brought together, ears $i\ i$ also provided upon the locking member $f$, a supporting-loop $m$ passing through apertures in said ears and having rotary connection therewith, the said loop being provided with cam portions $o\ o$, and cam portions $p\ p$ provided upon the locking member $e$ adapted for engagement with the cam portions $o\ o$ to secure the members of the lock in locking engagement, substantially as described.

In witness whereof I hereunto subscribe my name this 19th day of March, A. D. 1901.

WILLBUR H. JOHNSTON.

Witnesses:
GEORGE L. CRAGG,
HARVEY L. HANSON.